(12) United States Patent
Ohata et al.

(10) Patent No.: US 11,207,985 B2
(45) Date of Patent: Dec. 28, 2021

(54) POWER SUPPLY DEVICE

(71) Applicant: TOYOTA JIDOSHA KABUSHIKI KAISHA, Toyota (JP)

(72) Inventors: Hirotsugu Ohata, Susuno (JP); Naoyoshi Takamatsu, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/991,399

(22) Filed: Aug. 12, 2020

(65) Prior Publication Data

US 2021/0078415 A1    Mar. 18, 2021

(30) Foreign Application Priority Data

Sep. 12, 2019 (JP) .............................. JP2019-166214

(51) Int. Cl.
| | |
|---|---|
| *B60L 53/00* | (2019.01) |
| *H02J 7/00* | (2006.01) |
| *H02J 7/24* | (2006.01) |
| *H02P 27/08* | (2006.01) |
| *H02M 7/5387* | (2007.01) |
| *H02J 7/34* | (2006.01) |
| *H02J 7/06* | (2006.01) |
| *H02J 7/02* | (2016.01) |
| *B60L 50/60* | (2019.01) |

(52) U.S. Cl.
CPC ............ *B60L 53/00* (2019.02); *H02J 7/0068* (2013.01); *H02J 7/02* (2013.01); *H02J 7/06* (2013.01); *H02J 7/24* (2013.01); *H02J 7/345* (2013.01); *H02M 7/53871* (2013.01); *H02P 27/08* (2013.01); *B60L 50/60* (2019.02); *B60L 2210/30* (2013.01); *H02J 2207/20* (2020.01); *H02J 2207/50* (2020.01)

(58) Field of Classification Search
CPC ...... B60L 53/00; B60L 50/60; B60L 2210/30; H02J 7/0068; H02J 7/06; H02J 7/24; H02J 7/02; H02J 7/345; H02J 2207/20; H02J 2207/50; H02M 7/53871; H02P 27/08

See application file for complete search history.

(56) References Cited

U.S. PATENT DOCUMENTS 10,166,877 B2    1/2019  Zeng et al.
2016/0211749 A1*   7/2016  Okada .................... B60L 58/21

FOREIGN PATENT DOCUMENTS

| JP | 2007-252074 A | 9/2007 |
|---|---|---|
| JP | 2016-530858 A | 9/2016 |

* cited by examiner

*Primary Examiner* — Carlos Amaya
(74) *Attorney, Agent, or Firm* — Oliff PLC

(57) ABSTRACT

A power supply device includes a storage battery; a capacitor unit having first and second capacitor; a three phase power converter, connected in parallel with the storage battery, each phase having first to fourth switching elements in series; three connection terminals electrically connectable to a three-phase AC charger; and a control unit, in a case where the three connection terminals and the three-phase AC charger are electrically connected between the first switching elements and the second switching elements for the respective three phases in the three-level inverter, before the storage battery is charged by means of the three-phase AC charger, charging the first capacitor with use of the storage battery and setting voltage of the second capacitor to 0 V.

1 Claim, 6 Drawing Sheets

POWER SUPPLY DEVICE

CROSS-REFERENCE TO RELATED APPLICATION(S)

The present application claims priority to and incorporates by reference the entire contents of Japanese Patent Application No. 2019-166214 filed in Japan on Sep. 12, 2019.

BACKGROUND

The present disclosure relates to a power supply device.

In a power conversion device provided in an electric vehicle described in Japanese Laid-open Patent Publication No. 2007-252074, an inverter for driving a motor generator is configured to also have a part of a function as a charger. According to the power converter, the number of in-vehicle components for charging a battery serving as a storage battery can be reduced to the minimum by using a single-phase AC charger serving as an external charger, and the weight and price of the electric vehicle can be reduced.

Japanese Laid-open Patent Publication No. 2007-252074 also discloses a technique in which, at the time of charging the battery with use of the single-phase AC charger, on-off switching of each switching element of the inverter is controlled so that voltage supplied from the single-phase AC charger to the motor generator may be positive while voltage supplied from the battery to the motor generator may be negative.

SUMMARY

There is a need for providing a power supply device enabling a storage battery to be charged with use of a three-phase AC charger without separately providing a conversion circuit for converting three-phase AC voltage output from a three-phase charger into DC voltage.

According to an embodiment, a power supply device includes: a storage battery; a capacitor unit having a first capacitor and a second capacitor connected in series with each other between a positive terminal and a negative terminal of the storage battery; a power converter having a three-level inverter connected in parallel with the storage battery for three phases consisting of a U phase, a V phase, and a W phase, the three-level inverter including for each of the three phases a first switching element, a second switching element, a third switching element, and a fourth switching el errant connected in series, a first diode connecting between a portion between the first switching element and the second switching element and a portion between the first capacitor and the second capacitor, and a second diode connecting between a portion between the third switching element and the fourth switching element and the portion between the first capacitor and the second capacitor, turning on and off the first switching element, the second switching element, the third switching element, and the fourth switching element, and enabling three-level voltage to be output to a motor generator; three connection terminals electrically connectable to three terminals of a three-phase AC charger at least either between the first switching elements and the second switching elements or between the third switching elements and the fourth switching elements for the respective three phases in the three-level inverter; and a control unit, in a case in which the three connection terminals and the three terminals of the three-phase AC charger are electrically connected between the first switching elements and the second switching elements for the respective three phases in the three-level inverter, before the storage battery is charged by means of the three-phase AC charger, charging the first capacitor with use of the storage battery and setting voltage of the second capacitor to 0 V, and, when the storage battery is charged by means of the three-phase AC charger, turning on the third switching elements and fourth switching elements for the three phases and controlling on-off switching of the first switching elements and the second switching elements for the three phases in order for three-phase AC voltage output from the three-phase AC charger to be converted into DC voltage, and, in a case in which the three connection terminals and the three terminals of the three-phase AC charger are electrically connected between the third switching elements and the fourth switching elements for the respective three phases in the three-level inverter, before the storage battery is charged by means of the three-phase AC charger, charging the second capacitor with use of the storage battery and setting voltage of the first capacitor to 0 V, and, when the storage battery is charged by means of the three-phase AC charger, turning on the first switching elements and the second switching elements for the three phases and controlling on-off switching of the third switching elements and the fourth switching elements for the three phases in order for three-phase AC voltage output from the three-phase AC charger to be converted into DC voltage.

DETAILED DESCRIPTION

In the related art, the technique disclosed in Japanese Laid-open Patent Publication No. 2007-252074 is for single-phase AC charging, in which the battery is charged with use of the single-phase AC charger. Hence, for three-phase AC charging, in which the battery is charged with use of a three-phase AC charger, a conversion circuit for converting three-phase AC voltage output from the three-phase AC charger into DC voltage is required separately.

Hereinbelow, an embodiment of a power supply device according to the present disclosure will be described. Note that the present disclosure is not limited to the present embodiment.

Figure 1:
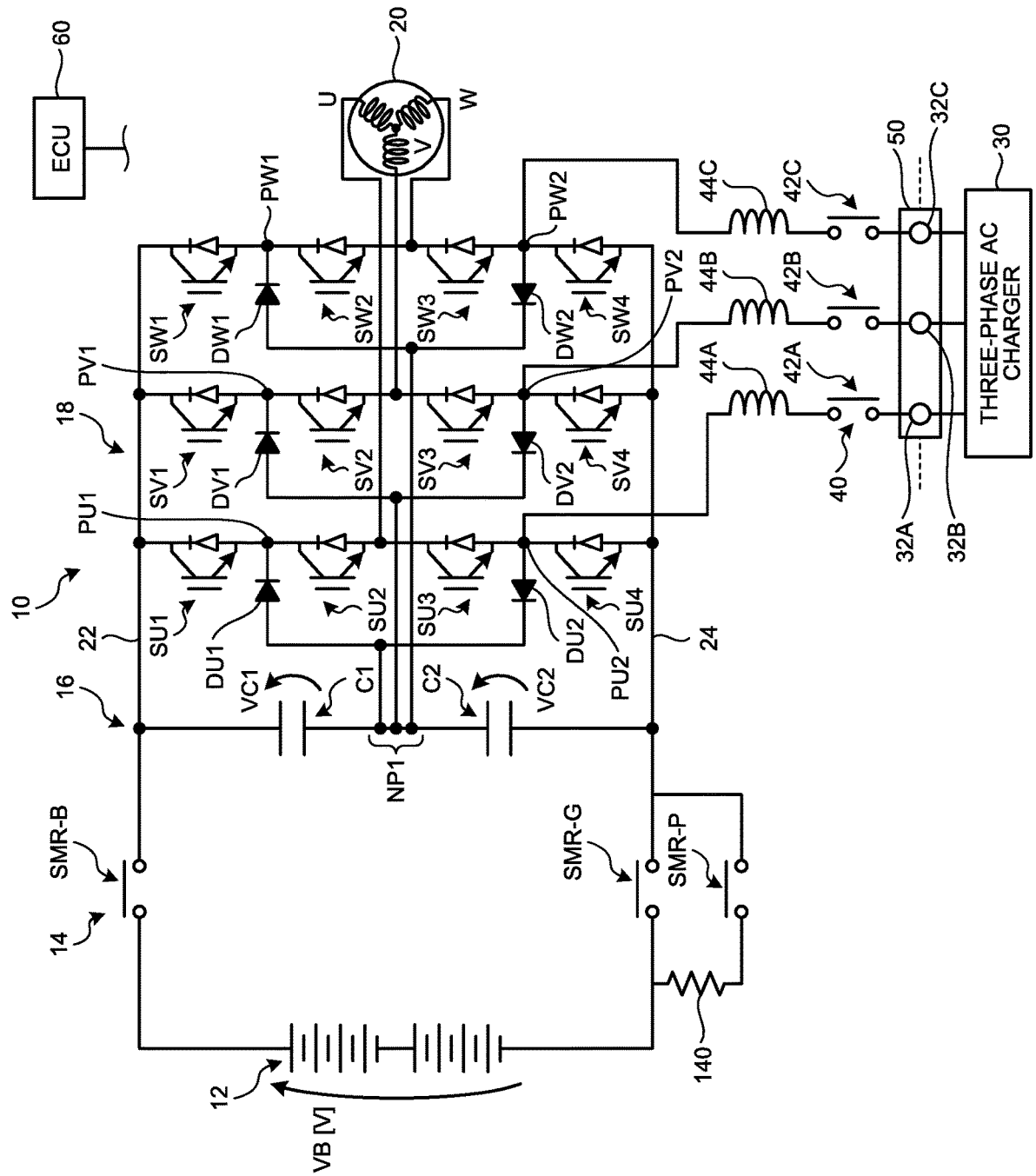
FIG. 1 is a configuration diagram of a power system including a power supply device according to an embodiment.

FIG. 1 is a configuration diagram of a power system including a power supply device 10 according to the embodiment. The power system according to the embodiment is applied to an electric vehicle capable of traveling using electric power such as an electric car, a hybrid vehicle, a plug-in hybrid vehicle (PHV), and a range extended electric vehicle (REEV).

The power system according to the embodiment includes the power supply device 10, a motor generator 20, a three-phase AC charger 30 and the like. Note that, in the power system according to the embodiment, the power supply device 10 and the motor generator 20 are mounted on the electric vehicle, and the three-phase AC charger 30 is provided in an external charging facility or the like installed outside the electric vehicle.

The power supply device 10 includes a battery 12, a system main relay device 14, a capacitor unit 16, a power converter 18, a charging relay device 40, an electronic control unit (ECU) 60 and the like. The power supply device 10 is electrically connected to the motor generator 20.

The battery 12 is a storage battery that can be charged and discharged as a high-voltage battery. Examples of the battery 12 that can be used are a nickel cadmium battery and a lead storage battery as well as an assembled lithium ion battery and an assembled nickel hydride battery.

The system main relay device 14 includes a system main relay SMR-B, a system main relay SMR-G, a system main relay SMR-P, a reactor 140 and the like. Note that "B" of the system main relay SMR-B means that the system main relay SMR-B is connected to the positive electrode side of the battery 12. "G" of the system main relay SMR-G means that the system main relay SMR-G is connected to the negative electrode side of the battery 12. "P" of the system main relay SMR-P means pre-charge.

The system main relay SMR-B is provided on a positive bus 22 connected to a positive terminal of the battery 12. The system main relay SMR-B receives a control signal from the ECU 60 (refer to FIG. 2), which is a below-mentioned not-illustrated electronic control unit, to switch between an on state and an off state.

The system main relay SMR-G is provided on a negative bus 24 connected to a negative terminal of the battery 12. The system main relay SMR-G receives a control signal from the ECU 60 to switch between an on state and an off state.

The system main relay SMR-P and the reactor 140 are connected in parallel with the system main relay SMR-G. The system main relay SMR-P and a reactor 141 are connected in series. The system main relay SMR-P receives a control signal from the ECU 60 to switch between an on state and an off state. The reactor 140 is used to suppress inrush current from flowing when the battery 12 is connected to the power converter 18.

The capacitor unit 16 includes a capacitor C1 serving as a first capacitor and a capacitor C2 serving as a second capacitor connected in series with each other between the positive terminal (positive bus 22) of the battery 12 and the negative terminal (negative bus 24) of the battery 12. The capacitor C1 and the capacitor C2 are connected to each other at a neutral point NP1. That is, the capacitor C1 has one terminal thereof connected to the positive bus 22 and the other terminal thereof connected to the neutral point NP1. Also, the capacitor C2 has one terminal thereof connected to the neutral point NP1 and the other terminal thereof connected to the negative bus 24. Therefore, in a case in which the capacitors C1 and C2 charge and discharge in similar manners and store equal charges at all times, neutral point voltage, which is voltage between the neutral point NP1 and the negative bus 24, is clamped to half the voltage of the battery 12. Note that the neutral point voltage corresponds to voltage VC2, which is voltage between terminals of the capacitor C2. Also, voltage VC1 in FIG. 1 is voltage between terminals of the capacitor C1.

The power converter 18 includes upper arms to which positive voltage, which is voltage between the positive bus 22 and the neutral point NP1, is supplied, and lower arms to which negative voltage, which is voltage between the neutral point NP1 and the negative bus 24, is supplied. In the power converter 18, the upper arms and the lower arms are arranged in series between the positive bus 22 and the negative bus 24 in a multiplexed manner and enable three-level three-phase AC voltage to be output to the motor generator 20.

Also, the power converter 18 includes a U-phase arm outputting U-phase voltage to the motor generator 20, a V-phase arm outputting V-phase voltage to the motor generator 20, and a W-phase arm outputting W-phase voltage to the motor generator 20.

In the U-phase arm, a first switching element SU1, a second switching element SU2, a third switching element SU3, and a fourth switching element SU4 are connected in series in this order from the positive bus 22 to the negative bus 24. Each of the switching elements SU1, SU2, SU3, and SU4 has a configuration in which a freewheel diode is anti-parallel to a semiconductor element. Meanwhile, the anti-parallel connection means that, for example, a cathode terminal of the diode is connected to a collector terminal of the semiconductor element, and an anode terminal of the diode is connected to an emitter terminal of the semiconductor element. Two diodes DU1 and DU2 connected in series are connected to an intermediate point PU1 (first intermediate point) serving as a connector provided between the first switching element SU1 and the second switching element SU2 and an intermediate point PU2 (second intermediate point) serving as a connector provided between the third switching element SU3 and the fourth switching element SU4 so that the diode on the anode side may be connected to the intermediate point PU2 and the diode on the cathode side may be connected to the intermediate point PU1. A connection point between the two diodes DU1 and DU2 is connected to the neutral point NP1 of the capacitor unit 16. In such a configuration, the U-phase voltage is output to the motor generator 20 from a connection point between the second switching element SU2 and the third switching element SU3.

In the V-phase arm a first switching element SV1, a second switching element SV2, a third switching element SV3, and a fourth switching element SV4 are connected in series in this order from the positive bus 22 to the negative bus 24. Each of the switching elements SV1, SV2, SV3, and SV4 has a configuration in which a freewheel diode is anti-parallel to a semiconductor element. Two diodes DV1 and DV2 connected in series are connected to an intermediate point PV1 (first intermediate point) serving as a connector provided between the first switching element SV1 and the second switching element SV2 and an intermediate point PV2 (second intermediate point) serving as a connector provided between the third switching element SV3 and the fourth switching element SV4 so that the diode on the anode side may be connected to the intermediate point PV2 and the diode on the cathode side may be connected to the intermediate point PV1. A connection point between the two diodes DV1 and DV2 is connected to the neutral point NP1 of the capacitor unit 16. In such a configuration, the V-phase voltage is output to the motor generator 20 from a connection point between the second switching element SV2 and the third switching element SV3.

In the W-phase arm, a first switching element SW1, a second switching element SW2, a third switching element SW3, and a fourth switching element SW4 are connected in series in this order from the positive bus 22 to the negative bus 24. Each of the switching elements SW1, SW2, SW3, and SW4 has a configuration in which a freewheel diode is anti-parallel to a semiconductor element. Two diodes DW1 and DW2 connected in series are connected to an intermediate point PW1 (first intermediate point) serving as a connector provided between the first switching element SW1 and the second switching element SW2 and an intermediate point PW2 (second intermediate point) serving as a connector provided between the third switching element SW3 and the fourth switching element SW4 so that the diode on the anode side may be connected to the intermediate point PW2 and the diode on the cathode side may be connected to the intermediate point PW1. A connection point between the two diodes DW1 and DW2 is connected to the neutral point NP1 of the capacitor unit 16. In such a configuration, the W-phase voltage is output to the motor generator 20 from a connection point between the second switching element SW2 and the third switching element SW3.

In the present embodiment, as each switching element of the power converter 18, an insulated gate bipolar transistor (IGBT) or the like can be used.

The motor generator 20 is a rotating electric machine mounted on the electric vehicle, functions as a motor when DC voltage output from the battery 12 is converted into three-phase AC voltage by the power converter 18 and supplied, and generates a driving force for causing the vehicle to travel. On the other hand, the motor generator 20 functions as a generator when the vehicle is braked, recovers braking energy, and outputs the braking energy as three-phase AC voltage. The three-phase AC voltage is then converted into DC voltage by the power converter 18 and is supplied to the battery 12 to cause the battery 12 to be charged.

The three-phase AC charger 30 is an external charger provided outside the vehicle to charge the battery 12. The three-phase AC charger 30 includes at a charger connector 50 for connecting a not-illustrated plug of the three-phase AC charger 30 to a not-illustrated connector on the vehicle side three terminals electrically connected to the power supply device 10, which are an A terminal 32A, a B terminal 32B, and a C terminal 32C. A charging relay device 40 including a charging relay 42A, a charging relay 42B, and a charging relay 42C, and reactors 44A, 44B, and 44C are provided between the charger connector 50 and the power converter 18.

The A terminal 32A of the three-phase AC charger 30 is electrically connected to the intermediate point PU2 between the switching element SU3 and the switching element SU4 in the U-phase arm of the power converter 18 via the charging relay 42A and the reactor 44A. Also, the B terminal 32B of the three-phase AC charger 30 is electrically connected to the intermediate point PV2 between the switching element SV3 and the switching element SV4 in the V-phase arm o of the power converter 18 via the charging relay 42B and the reactor 44B. Further, the C terminal 32C of the three-phase AC charger 30 is electrically connected to the intermediate point PW2 between the switching element SW3 and the switching element SW4 in the W-phase arm of the power converter 18 via the charging relay 42C and the reactor 44C.

Meanwhile, the A terminal 32A, the B terminal 32B, and the C terminal 32C of the three-phase AC charger 30 are simply required to enable electric connection to at least either the intermediate points PU1, PV1, and PW1 between the first switching elements and the second switching elements or the intermediate points PU2, PV2, and PW2 between the third switching elements and the fourth switching elements in the U-phase arm, the V-phase arm, and the W-phase arm, respectively.

That is, the A terminal 32A of the three-phase AC charger 30 may electrically be connected to the intermediate point PU1 between the first switching element SU1 and the second switching element SU2 in the U-phase arm the B terminal 32B of the three-phase AC charger 30 may electrically be connected to the intermediate point PV1 between the first switching element SV1 and the second switching element SV2 in the V-phase arm, and the C terminal 32C of the three-phase AC charger 30 may electrically be connected to the intermediate point PW1 between the first switching element SW1 and the second switching element SW2 in the W-phase arm.

In this manner, the power supply device 10 according to the embodiment is provided with three connection terminals electrically connectable to the A terminal 32A, the B terminal 32B, and the C terminal 32C of the three-phase AC charger 30 at least either between the first switching elements and the second switching elements or between the third switching elements and the fourth switching elements in the U-phase arm, the V-phase arm, and the W-phase arm. In the present embodiment, as the three connection terminals provided between the first switching elements SU1, SV1, and SW1 and the second switching elements SU2, SV2, and SW2 in the U-phase arm, the V-phase arm, and the W-phase arm, the intermediate points PU1, PV1, and PW1 can be used. Also, in the present embodiment, as the three connection terminals provided between the third switching elements SU3, SV3, and SW3 and the fourth switching elements SU4, SV4, and SW4 in the U-phase arm, the V-phase arm, and the W-phase arm, the intermediate points PU2, PV2, and PW2 can be used.

Meanwhile, the three connection terminals electrically connectable to the A terminal 32A, the B terminal 32B, and the C terminal 32C of the three-phase AC charger 30 may be provided only between the first switching elements SU1, SV1, and SW1 and the second switching elements SU2, SV2, and SW2 in the U-phase arm, the V-phase arm, and the W-phase arm. Also, the three connection terminals electrically connectable to the A terminal 32A, the B terminal 32B, and the C terminal 32C of the three-phase AC charger 30 may be provided only between the third switching elements SU3, SV3, and SW3 and the fourth switching elements SU4, SV4, and SW4 in the U-phase arm, the V-phase arm, and the W-phase arm.

Figure 2:
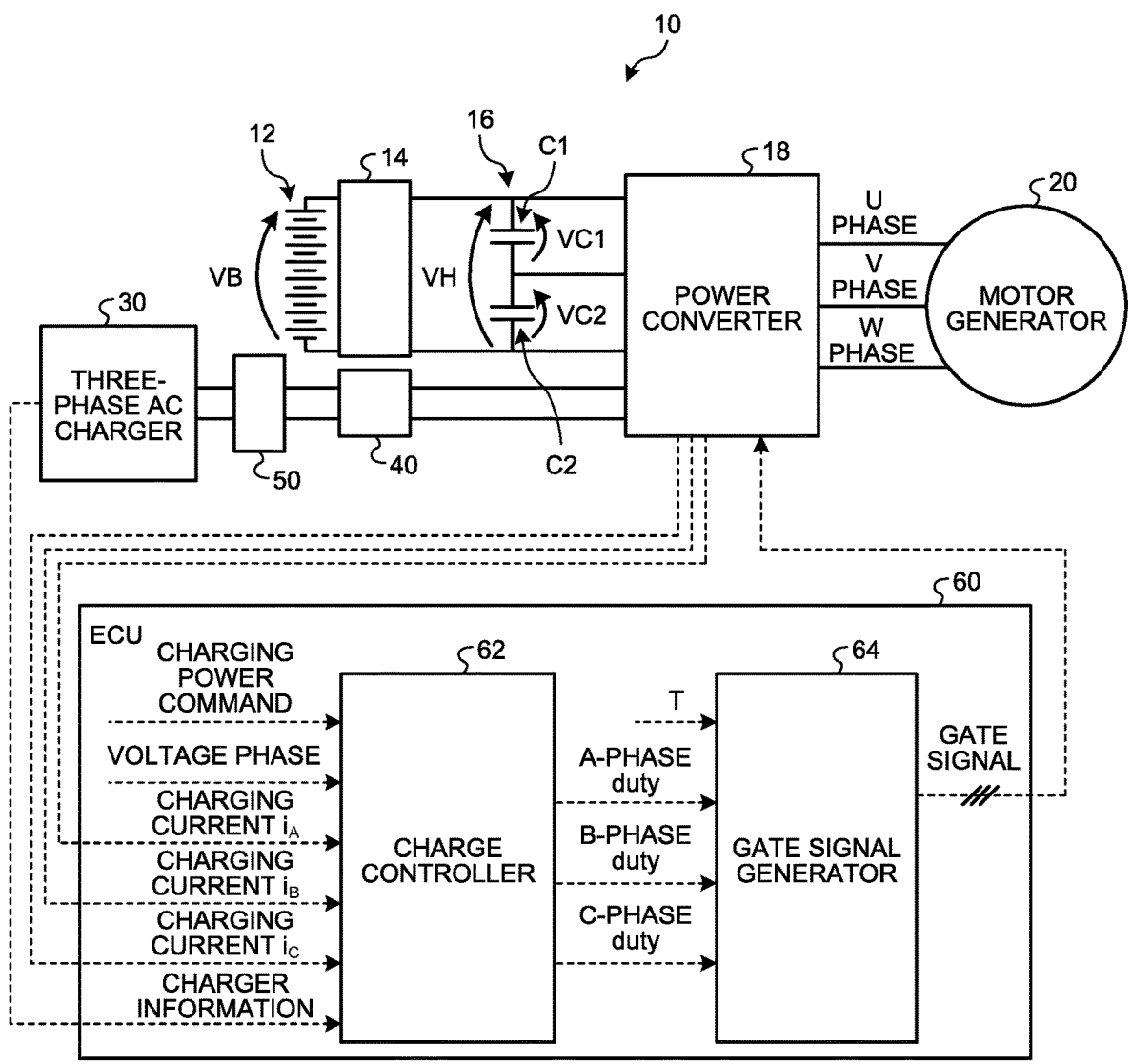
FIG. 2 is a block diagram illustrating a configuration of the power system according to the embodiment.

FIG. 2 is a block diagram illustrating a configuration of the power system according to the embodiment. The ECU 60 is an electronic control unit controlling operations of the power supply device 10 and the like. The ECU 60 includes a charge controller 62, a gate signal generator 64, and the like. In FIG. 2, "VB" is battery voltage, and "VH" is charging voltage.

Into the charge controller 62 are input various signals such as a charging power command signal output from a not-illustrated system controller, a voltage phase signal output from a not-illustrated voltmeter provided in the power converter 18, charging current signals $i_A$, $i_B$, and $i_C$ output from a not-illustrated ammeter provided in the power converter 18, and a charger information signal output from the three-phase AC charger 30. The charge controller 62 controls charging current to establish active power=charging power command value and reactive power=0. Also, the charge controller 62 outputs to the gate signal generator 64 A-phase duty for on-off switching of the U-phase switching elements SU3 and SU4, B-phase duty for on-off switching of the V-phase switching elements SV3 and SV4, C-phase duty for on-off switching of the W-phase switching elements SW3 and SW4 and the like derived based on the charging power command signal, the voltage phase signal, and the charging current signals $i_A$, $i_B$, and $i_C$, for example.

Meanwhile, in a case in which the A terminal 32A of the three-phase AC charger 30 is electrically connected to the intermediate point PU1, in which the B terminal 32B of the three-phase AC charger 30 is electrically connected to the intermediate point PV1, and in which the C terminal 32C of the three-phase AC charger 30 is electrically connected to the intermediate point PW1, the charge controller 62 outputs to the gate signal generator 64 A-phase duty for on-off switching of the U-phase switching elements SU1 and SU2, B-phase duty for on-off switching of the V-phase switching elements SV1 and SV2, C-phase duty for on-off switching of the W-phase switching elements SW1 and SW2 and the like.

The gate signal generator 64 generates a gate signal for on-off switching of each of the switching elements in the power converter 18 and outputs the generated gate signal to each of the switching elements. For example, at the time of charging the battery 12 by means of the three-phase AC charger 30, the gate signal generator 64 outputs a gate signal for on-off switching based on A-phase duty to the U-phase switching elements SU3 and SU4, a gate signal for on-off switching based on B-phase duty to the V-phase switching elements SV3 and SV4, and a gate signal for on-off switching based on C-phase duty to the W-phase switching elements SW3 and SW4.

Meanwhile, in a case in which the A terminal 32A of the three-phase AC charger 30 is electrically connected to the intermediate point PU1, in which the B terminal 32B of the three-phase AC charger 30 is electrically connected to the intermediate point PV1, and in which the C terminal 32C of the three-phase AC charger 30 is electrically connected to the intermediate point PW1, at the time of charging the battery 12 by means of the three-phase AC charger 30, the gate signal generator 64 outputs a gate signal for on-off switching based on A-phase duty to the U-phase switching elements SU1 and SU2, a gate signal for on-off switching based on B-phase duty to the V-phase switching elements SV1 and SV2, and a gate signal for on-off switching based on C-phase duty to the W-phase switching elements SW1 and SW2.

Next, a method for charging the battery 12 by means of the three-phase AC charger 30 in the power supply device 10 illustrated in FIG. 1 will be described. First, the ECU 60 turns off the system main relays SMR-B, SMR-G, and SMR-P of the system main relay device 14, the charging relays 42A, 42B, and 42C of the charging relay device 40, and all of the switching elements of the power converter 18 in the power supply device 10. Also, at this time, voltage values of the capacitors C1 and C2 are 0 V since electric charges are emitted from the capacitors C1 and C2 through the power lines.

Figure 3:
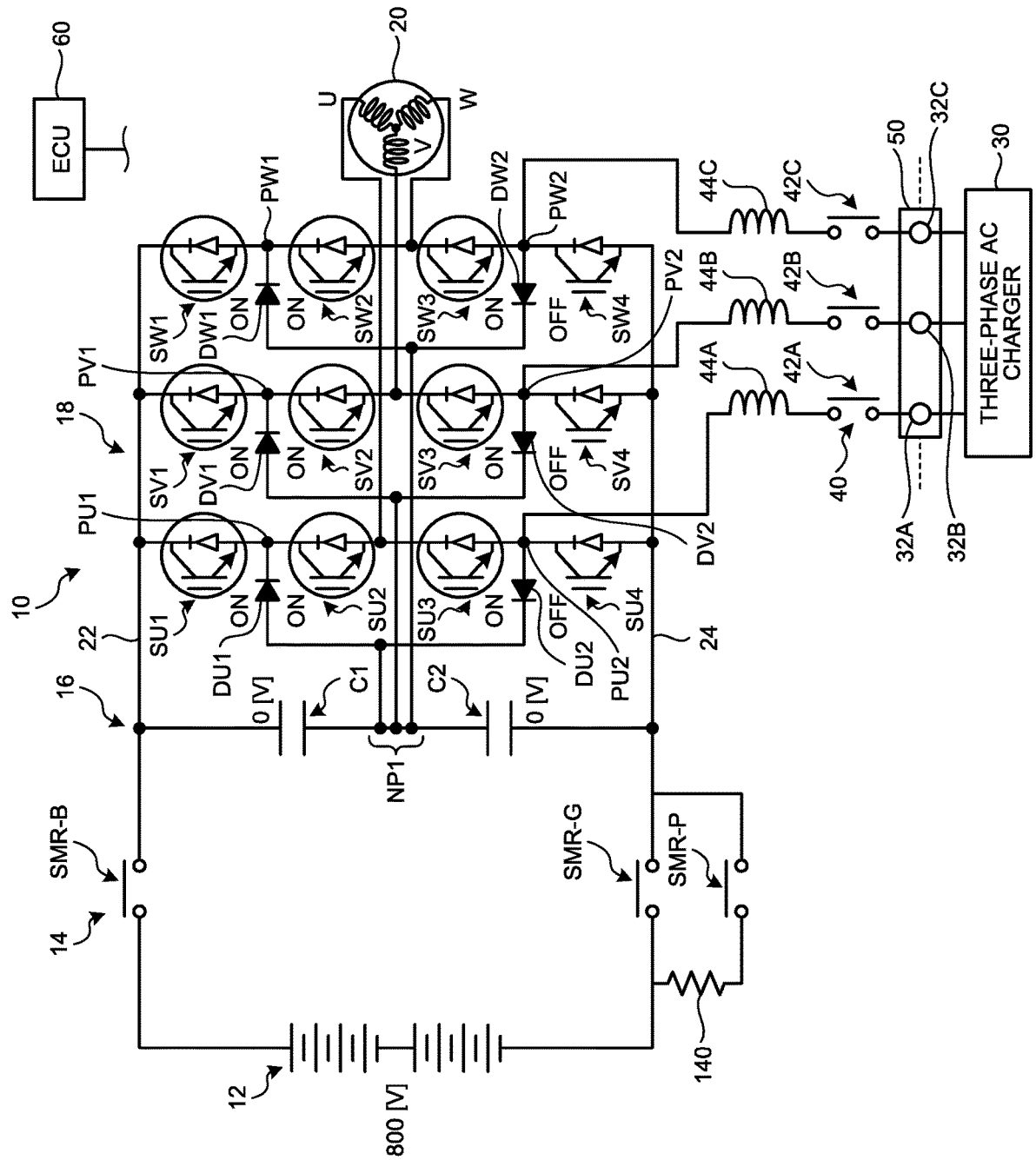
FIG. 3 illustrates a first circuit state before a battery is charged by a three-phase AC charger.

Subsequently, as illustrated in FIG. 3, the ECU 60 switches the first switching elements SU1, SV1, and SW1, the second switching elements SU2, SV2, and SW2, and the third switching elements SU3, SV3, and SW3 of the power converter 18 from off states to on states. Note that, as illustrated in FIG. 3, the on-state switching elements are circled.

Figure 4:
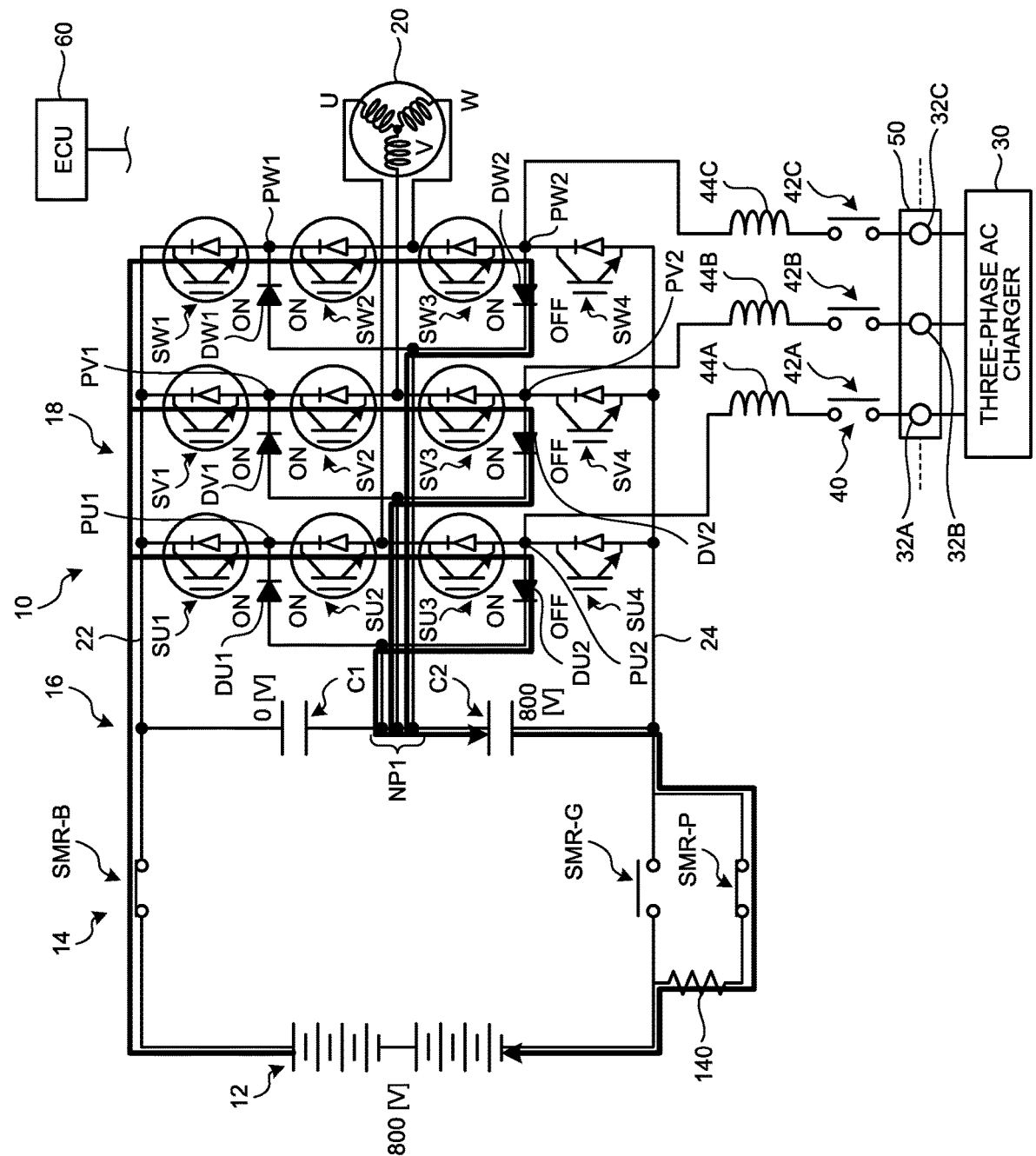
FIG. 4 illustrates a second circuit state before the battery is charged by the three-phase AC charger.

Subsequently, as illustrated in FIG. 4, the ECU 60 switches the system main relays SMR-B and SMR-P of the system main relay device 14 from off states to on states to start charging the capacitor C2 with use of power from the battery 12 until the voltage of the capacitor C2 reaches 800 V.

Figure 5:
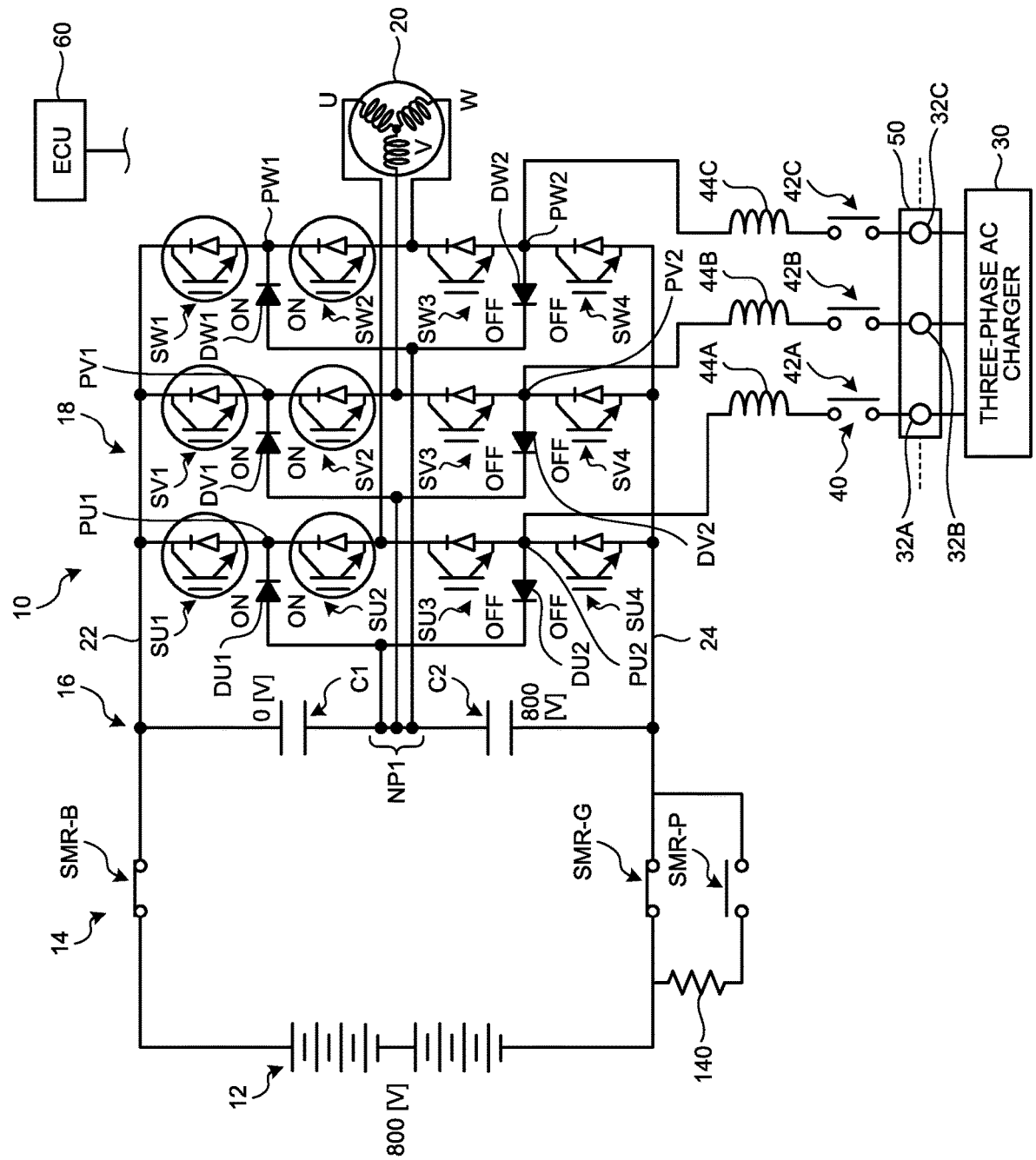
FIG. 5 illustrates a third circuit state before the battery is charged by the three-phase AC charger.

After charging of the capacitor C2 is completed, as illustrated in FIG. 5, the ECU 60 switches the system main relay SMR-G of the system main relay device 14 from an off state to an on state and switches the system main relay SMR-P from an on state to an off state. The ECU 60 also switches the third switching elements SU3, SV3, and SW3 of the power converter 18 from on states to off states.

Figure 6:
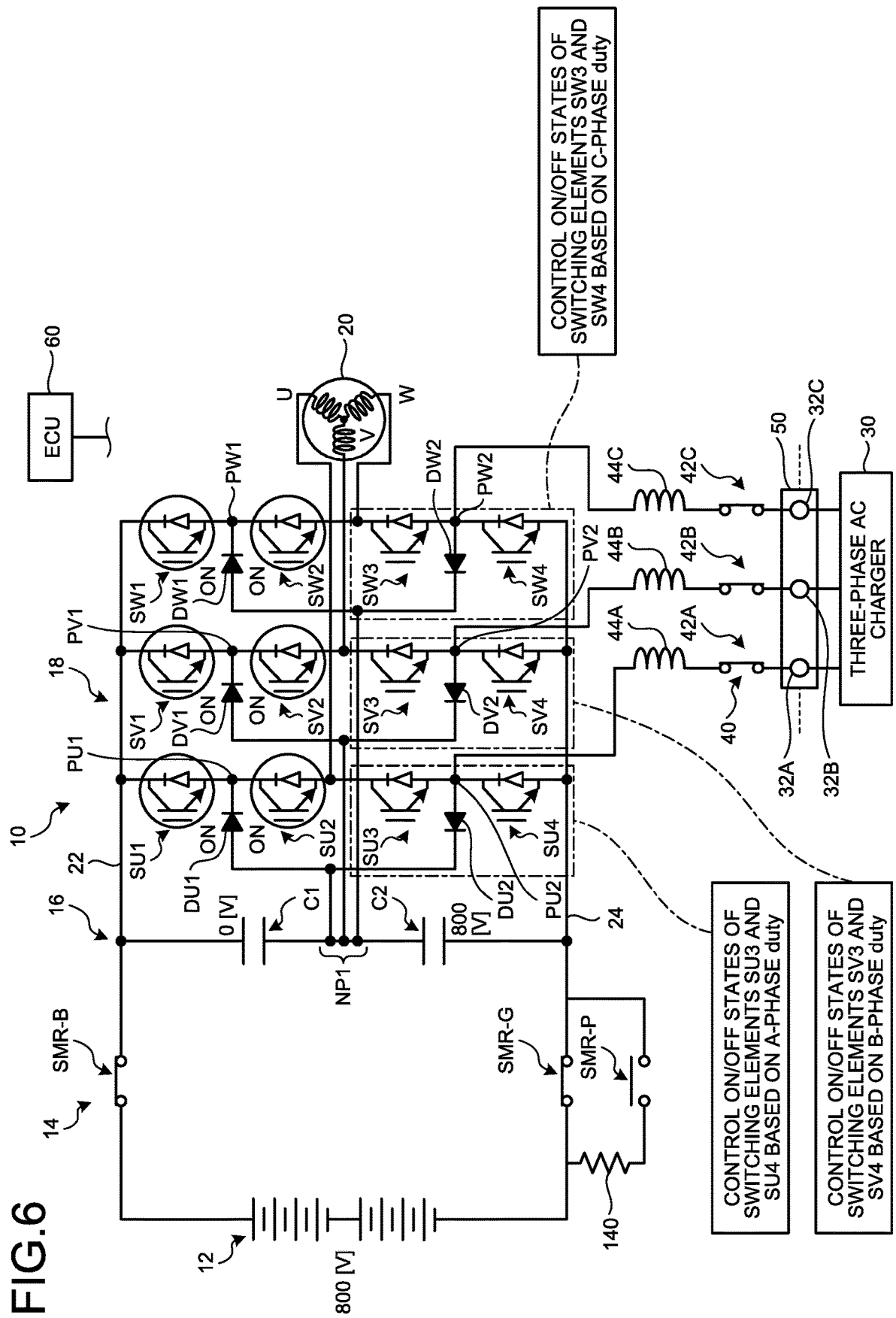
FIG. 6 illustrates a circuit state when the battery is charged by the three-phase AC charger.

Subsequently, as illustrated in FIG. 6, the ECU 60 switches the charging relays 42A, 42B, and 42C of the charging relay device 40 from off states to on states to start charging the battery 12 with use of power from the three-phase AC charger 30. At this time, the ECU 60 controls the capacitor C2, the U-phase switching elements SU3 and SU4, the V-phase switching elements SV3 and SU4, and the W-phase switching elements SW3 and SW4, regarding the capacitor C2, the U-phase switching elements SU3 and SU4, the V-phase switching elements SV3 and SU4, and the W-phase switching elements SW3 and SW4 as a two-level inverter, and uses the two-level inverter as a three-phase AC-DC converter. Specifically, the ECU 60 controls on-off switching of each of the U-phase switching elements SU3 and SU4 based on A-phase duty, controls on-off switching of each of the V-phase switching elements SV3 and SV4 based on B-phase duty, and controls on-off switching of each of the W-phase switching elements SW3 and SW4 based on C-phase duty to convert three-phase AC voltage of the three-phase AC charger 30 into DC voltage and charges the battery 12 with use of the converted DC voltage.

Also, in the power supply device 10 according to the embodiment, when the battery 12 is charged by the three-phase AC charger 30, the first switching elements SU1, SV1, and SW1 and the second switching elements SU2, SV2, and SW2 of the power converter 18 are fixed in on states. Consequently, power supply to the motor generator 20 is cut off, and it is possible to prevent the motor generator 20 from generating a driving force and rotating.

Meanwhile, unlike the power supply device 10 illustrated in FIGS. 3 to 6, in a case in which the intermediate points PU1, PV1, and PW1 including the first switching elements SU1, SV1, and SW1 and the second switching elements SU2, SV2, and SW2 are electrically connected to the A terminal 32A, the B terminal 32B, and the C terminal 32C of the three-phase AC charger 30, the ECU 60 controls the power supply device 10 and the like in the following manner to charge the battery 12 by means of the three-phase AC charger 30. That is, the switching elements and the like on-off switching of which is controlled by the ECU 60 are appropriately replaced, and the battery 12 is charged by means of the three-phase AC charger 30 in a similar procedure as that described with use of the power supply device 10 illustrated in FIGS. 3 to 6.

First, before the battery 12 is charged by means of the three-phase AC charger 30, the ECU 60 charges the capacitor C1 with use of power from the battery 12 until the voltage reaches 800 V and sets the voltage of the capacitor C2 to 0 V. When the battery 12 is charged by means of the three-phase AC charger 30, the ECU 60 turns on the three-phase third switching elements SU3, SV3, and SW3 and fourth switching elements SU4, SV4, and SW4 and controls on-off switching of the three-phase first switching elements SU1, SV1, and SW1 and second switching elements SU2, SV2, and SW2 so that three-phase AC voltage output from the three-phase AC charger 30 may be converted into DC voltage based on A-phase duty, B-phase duty, and C-phase duty. The battery 12 is then charged with use of the converted DC voltage.

In the power supply device 10 according to the embodiment, at the time of supplying power from the battery 12 to the motor generator 20, the power converter 18 converting DC voltage output from the battery 12 into three-phase AC voltage converts three-phase AC voltage output from the three-phase AC charger 30 into DC voltage to enable the battery 12 to be charged. Accordingly, the power supply device 10 according to the embodiment can charge the battery 12 by means of the three-phase AC charger 30 without separately providing a conversion circuit for converting the three-phase AC voltage output from the three-phase AC charger 30 into the DC voltage. Therefore, since the conversion circuit is not provided separately, the size and cost of the power supply device 10 can be reduced.

In a power supply device according to the present disclosure, at the time of supplying power from a storage battery to a motor generator, a power converter converting DC voltage from the storage battery into three-phase AC voltage converts three-phase AC voltage output from a three-phase AC charger into DC voltage to enable the storage battery to be charged. Therefore, the power supply device according to the present disclosure exerts an effect of enabling the storage battery to be charged by means of the three-phase AC charger without separately providing a conversion circuit for converting the three-phase AC voltage output from the three-phase charger into the DC voltage.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
a storage battery;
a capacitor unit having a first capacitor and a second capacitor connected in series with each other between a positive terminal and a negative terminal of the storage battery;
a power converter having a three-level inverter connected in parallel with the storage battery for three phases consisting of a U phase, a V phase, and a W phase, the three-level inverter including for each of the three phases a first switching element, a second switching element, a third switching element, and a fourth switching element connected in series, a first diode connecting between a portion between the first switching element and the second switching element and a portion between the first capacitor and the second capacitor, and a second diode connecting between a portion between the third switching element and the fourth switching element and the portion between the first capacitor and the second capacitor, turning on and off the first switching element, the second switching element, the third switching element, and the fourth switching element, and enabling three-level voltage to be output to a motor generator;
three connection terminals electrically connectable to three terminals of a three-phase AC charger at least either between the first switching elements and the second switching elements or between the third switching elements and the fourth switching elements for the respective three phases in the three-level inverter; and
a control unit, in a case in which the three connection terminals and the three terminals of the three-phase AC charger are electrically connected between the first switching elements and the second switching elements for the respective three phases in the three-level inverter,
before the storage battery is charged by means of the three-phase AC charger, charging the first capacitor with use of the storage battery and setting voltage of the second capacitor to 0 V, and,
when the storage battery is charged by means of the three-phase AC charger, turning on the third switching elements and fourth switching elements for the three phases and controlling on-off switching of the first switching elements and the second switching elements for the three phases in order for three-phase AC voltage output from the three-phase AC charger to be converted into DC voltage, and,
in a case in which the three connection terminals and the three terminals of the three-phase AC charger are electrically connected between the third switching elements and the fourth switching elements for the respective three phases in the three-level inverter,
before the storage battery is charged by means of the three-phase AC charger, charging the second capacitor with use of the storage battery and setting voltage of the first capacitor to 0 V, and,
when the storage battery is charged by means of the three-phase AC charger, turning on the first switching elements and the second switching elements for the three phases and controlling on-off switching of the third switching elements and the fourth switching elements for the three phases in order for three-phase AC voltage output from the three-phase AC charger to be converted into DC voltage.

* * * * *